United States Patent
Mueller

(10) Patent No.: US 6,814,297 B2
(45) Date of Patent: Nov. 9, 2004

(54) METHOD AND ARRANGEMENT FOR CONTROLLING ACCESS TO EEPROMS AND A CORRESPONDING COMPUTER SOFTWARE PRODUCT AND A CORRESPONDING COMPUTER-READABLE STORAGE MEDIUM

(75) Inventor: Detlef Mueller, Barsbuettel (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/320,267

(22) Filed: Dec. 16, 2002

(65) Prior Publication Data

US 2003/0128583 A1 Jul. 10, 2003

(30) Foreign Application Priority Data

Dec. 19, 2001 (DE) .......................................... 101 62 308

(51) Int. Cl.⁷ .......................... G06K 19/06; G11C 16/04
(52) U.S. Cl. ..................... 235/492; 365/185.04; 365/96; 365/94; 365/185.09; 365/189
(58) Field of Search ............................ 365/185.09, 189, 365/185.04, 96, 94, 225.7; 710/327, 239; 711/103, 193, 163, 152; 257/529, 149, E23.149; 437/422; 235/492, 493

(56) References Cited

U.S. PATENT DOCUMENTS

| | | | | |
|---|---|---|---|---|
| 4,441,170 A | * | 4/1984 | Folmsbee et al. | ........... 365/200 |
| 4,641,241 A | * | 2/1987 | Boram | ......................... 705/12 |
| 4,841,133 A | * | 6/1989 | Gercekci et al. | ............. 235/492 |
| 4,870,260 A | * | 9/1989 | Niepolomski et al. | ....... 235/381 |
| 4,907,273 A | * | 3/1990 | Wiedemer | ................... 380/230 |
| 5,345,413 A | * | 9/1994 | Fisher et al. | .................. 365/96 |
| 5,446,864 A | * | 8/1995 | Burghardt et al. | ........... 711/100 |
| 5,504,701 A | * | 4/1996 | Takahashi et al. | ...... 365/185.04 |
| 5,544,111 A | * | 8/1996 | Berthozat et al. | ......... 365/225.7 |
| 6,446,177 B1 | * | 9/2002 | Tanaka et al. | ............... 711/163 |
| 6,600,676 B2 | * | 7/2003 | Shibata et al. | .......... 365/185.04 |
| 2002/0057598 A1 | * | 5/2002 | Sakamoto | .............. 365/185.22 |

FOREIGN PATENT DOCUMENTS

| | | | | |
|---|---|---|---|---|
| JP | 10134594 A | * | 5/1998 | ........... G11C/29/00 |
| WO | WO9310498 | | 5/1993 | ........... G06F/12/14 |

* cited by examiner

Primary Examiner—Karl D. Frech
Assistant Examiner—Daniel Walsh
(74) Attorney, Agent, or Firm—Kevin Simons

(57) ABSTRACT

The invention relates to a method and an arrangement for controlling access to EEPROMs' and to a corresponding computer software product and a corresponding computer-readable storage medium, which can in particular be used to prevent the unauthorized manipulation of EEPROMs. Specifically, it is possible by using the invention to stop the unauthorized use of totally erased EEPROMs on smart-card controllers.

EEPROM fuses that, depending on the application, comprise one or more bits, are used in the continuing course of operation of a controller, to permit or forbid security-related functions. Provision is made as part of the invention for EEPROM fuses to be used to permit writing to the EEPROM only if said fuse comprises a given combination of bits. Any manipulation of this fuse, such as by erasing the entire matrix for example or else by manipulating the booting process, then bars all further write accesses to the EEPROM. Similarly, a chip card where the user erases the entire EEPROM in the event of an attack being detected is automatically barred in this way against any further writing operations.

13 Claims, No Drawings

METHOD AND ARRANGEMENT FOR CONTROLLING ACCESS TO EEPROMS AND A CORRESPONDING COMPUTER SOFTWARE PRODUCT AND A CORRESPONDING COMPUTER-READABLE STORAGE MEDIUM

The invention relates to a method and an arrangement for controlling access to EEPROMs and to a corresponding computer software product and a corresponding computer-readable storage medium, which can in particular be used to prevent the unauthorized manipulation of EEPROMs. Specifically, it is possible by using the invention to stop the unauthorized use of totally erased EEPROMs in smart-card controllers.

The development of microelectronics in the seventies made it possible for miniature computers in credit card format with no user interface to be produced. Computers of this kind are referred to as smart cards. In a smart card, a data memory and an arithmetic and logic unit are integrated into a single chip measuring a few square millimeters in size. Smart cards are used in particular as telephone cards and GSM SIM cards and in the banking field and in health care. The smart card has thus become a computing platform that we see wherever we turn.

Smart cards are currently regarded primarily as a safe and secure place for holding secret data and as a safe and secure platform for running cryptographic algorithms. The reason why the data and algorithms on the card are assumed to enjoy relatively high safety and security lies in the hardware construction of the card and in the interfaces that are run to the exterior. From the outside the card looks like a "black box", whose functions can only be accessed via a well-defined hardware and software interface and which can compel the observance of certain security policies. On the one hand, access to data can be linked to certain conditions. Access from outside to critical data, such as secret keys in a public key process for example, may even be totally barred. On the other hand a smart card is capable of running algorithms without it being possible for the execution of the individual operations to be observed from outside. The algorithms themselves may be protected on the card against being altered or read out. In an object-orientated sense, the smart card can be thought of as a type of abstract data that has a well-defined interface, that behaves in a specified way and that is itself capable of ensuring that certain integrity conditions are observed with regard to its state.

Essentially, there are two different types of smart card. Memory cards have simply a serial interface, addressing and security logic and ROM and EEPROM memories. Such cards perform only limited functions and are used for a specific application. This is why they are particularly cheap to produce. Smart cards produced in the form of microprocessor cards constitute, in principle, a complete general-purpose computer.

The process of manufacturing and supplying chip cards can be divided into the following phases:
  production of the chip,
  embedding of the chip,
  printing of the card,
  personalization of the card,
  issue of the card.

Each phase of the process is generally carried out by a company specializing in the particular operation. When the chips are being produced, care must be taken to ensure good security within the firm, particularly when the cards involved have hard-wired security logic. To enable the manufacturer to carry out a proper final test, the entire memory has to be freely accessible. Only after the final test is the chip made secure by means of a transport code. Thereafter, access to the card memory is possible only for authorized bodies that know the transport code. Hence there is no point in stealing brand-new chips. The authorized bodies may be card personalizers or issuers. No further protective functions are required for the embedding and printing operations. There is no need for the firms involved to know the transport code.

It is generally not the card manufacturer but the issuing body (e.g. a bank, telephone company, private or public health-care scheme, etc) that puts the personal data into the card. This process is known as personalization and to perform it, it is necessary to know the transport code.

The issue of the card, i.e. its movement from the issuing body to the card holder, poses another security problem. To be exact, it is only the issue of the card to the card holder in person in return for a signature and production of an identity card or other personal identification that is secure. It is true that sending out by post is often cheaper, but it is also not very secure. Another problem is notifying the card holder of the PIN number, in which case the same care has to be taken as with the card.

Because of the potentially dangerous security-related information held in the memories present in smart card controllers, not only do the above safeguarding steps have to be taken but additional protection also needs to be provided against the possible activities of hackers, which may cover every phase of the life of a smart card beginning with the manufacture of the card and extending through its transport and use to the manipulation of cards that have become unusable.

To ensure the greatest possible security for smart-card controllers, use is made of EEPROM fuses to set to various states or modes (such as the test/user mode, configuring, trimming parameters for pieces of analog circuitry, etc). Depending on the application, a fuse may consist of one or more bits. The EEPROM fuses are normally read from the EEPROM during the reset phase by means of a boot mechanism and are stored in state memories that permit or prohibit security-related functions during the continuing course of operation.

In conventional smart-card controllers, the EEPROM is written to under the control of software. Personalization routines in particular, both in the user program and, where required, in the test program, must include software safeguards against unauthorized writing, particularly writing to an erased EEPROM in order to prevent a smart card with an erased EEPROM being misused by an attacker as a blank card. Certain users require the EEPROM to be totally erased in the event of an attack on the smart card being detected and in this case in particular there need to be good software safeguards to ensure that it happens.

Described in international application WO 93/10498 is a microcontroller that contains an EPROM program memory and that is able to operate in various modes and particularly a security mode. The microcontroller also has EPROM configuring fuses that configure the program memory of the microcontroller and that check, and where appropriate refuse, any read, verification and/or write accesses from regions of the chip that are not specially safeguarded. The bit values of the said fuses represent the condition in which they are. Account is taken of these conditions or values by reading the value of the bit forming the particular fuse stored in the EEPROM program memory. The security of the chip is set by configuring the microcontroller in the protected mode, which is done by setting the appropriate bits of the fuses that represent the desired configuration.

What are not detected by this method are attacks on the smart card security that alter the contents of EEPROMs, and hence the contents of EEPROM fuses as well, thus enabling EEPROM fuses that have already been manipulated for example to be read out at reset.

It is therefore an object of the invention to specify a method, an arrangement, a corresponding computer software product and a corresponding computer-readable storage medium, of the generic kind, by means of which the disadvantages of conventional protective measures are overcome and manipulation of the contents of the EEPROM is prevented by hardware means.

In accordance with the invention, this object is achieved by means of a collaborative association of the features in the characterizing clauses of claims 1, 11, 13 and 10 with the features in the preambles. Advantageous embodiments of the invention are detailed in the subclaims.

A special advantage of the method of controlling access to EEPROMs lies in the fact that access to the EEPROM or to parts of the EEPROM is controlled by fuses.

An arrangement for controlling access to EEPROMs is advantageously so arranged that it comprises a processor that is so arranged that control of the access to EEPROMs can be performed by controlling access to the EEPROM or to parts of the EEPROM by fuses.

A computer software product for controlling access to EEPROMs comprises a computer-readable storage medium on which is stored a program that, once it has been loaded into the memory of a computer or smart-card controller, enables the computer or smart-card controller to perform control of the access to EEPROMs by controlling access to the EEPROM or to parts of the EEPROM by fuses.

To perform control of the access to EEPROMs, use is advantageously made of a computer-readable storage medium on which is stored a program that, once it has been loaded into the memory of a computer or smart-card controller, enables the computer or smart-card controller to perform control of the access to EEPROMs by controlling access to the EEPROM or to parts of the EEPROM by fuses.

Another advantage of the method according to the invention is that access to the EEPROM of a microcontroller, and particularly of a smart-card controller, or to parts of such an EEPROM, is controlled. It has proved to be advantageous for write access to the EEPROM to be possible only when at least one fuse is of well defined values.

In a preferred embodiment of the method according to the invention, provision is made for write accesses to the EEPROM to be barred once the EEPROM matrix has been erased. In a further advantageous embodiment of the method according to the invention, the fuse(s) comprises (comprise) a plurality of bits. When access to EEPROMs is being controlled, it is found to be advantageous for the fuse(s) controlling access to be read from the EEPROM by means of a boot sequence during the reset phase.

It is also found to be advantageous for the fuse(s) controlling access to be stored in at least one state memory. A further advantage of the method according to the invention lies in the fact that the security row of the EEPROM can be written to in the test mode of the microcontroller. What is more, provision is made in a preferred embodiment of the method according to the invention for the part of the memory matrix that is not the security row to be protectable against write access by at least one fuse in the test mode of the microcontroller.

It is also found to be advantageous for block modes to be handled when the microcontroller is being tested.

As well as this, provision is made in a preferred embodiment of the arrangement according to the invention for the processor to be part of a smart-card controller and for the arrangement to be a smart card.

The special advantage of the invention lies in particular in the fact that the write embargo protects the EEPROM against manipulation, and particularly against all known or unknown attacks that manipulate the complete EEPROM matrix, by hardware means.

These and other aspects of the invention are apparent from and will be elucidated with reference to the embodiment described hereinafter.

As mentioned, the EEPROM fuses are read from the EEPROM by means of a boot mechanism during, for example, the reset phase and are stored in state memories that, in the continuing course of operations, permit or forbid security-related functions. Provision is made as part of the invention for one or more such EEPROM fuses comprising a plurality of bits to be used to permit the specific security-related function of writing to the EEPROM only if the fuse concerned is of a given value, i.e. is a given combination of bits. Any manipulation of this fuse, such as by erasing the entire matrix for example or else by manipulating the booting process, then bars all further write accesses to the EEPROM. Similarly, a chip card where the user erases the entire EEPROM in the event of an attack being detected is automatically barred in this way against any further writing operations. Thus it is in particular impossible for any further data (such as keys) or programs to be loaded into the EEPROM. A chip card that is protected in this way by hardware means is thus of no use to a potential attacker.

In terms of circuitry, implementation must take place in such a way that the security row of the EEPROM, in which the EEPROM fuses are situated, can always be written to in the test mode, while the rest of the matrix is protected by the write-protect fuses. Writing to the matrix must be enabled by setting the write-protect fuses in the appropriate way. In this way it also becomes possible for block modes to be handled, when testing for example.

The invention is not limited to the embodiments described here. By combining and modifying the means and features mentioned it is in fact possible to produce other variant embodiments without thereby exceeding the scope of the invention.

What is claimed is:

1. A method of controlling access to an EEPROMs, characterized in that access to the EEPROM or parts of the EEPROM is controlled by fuses, at least one of the fuses being configured to automatically bar write access to the EEPROM in response to detection that the EEPROM has been erased.

2. A method as claimed in claim 1, characterized in that access to the EPROM of a microcontroller, and particularly of a smart-card controller, or parts of such an EEPROM, is controlled.

3. A method as claimed in claim 1, characterized in that write access to the EEPROM is possible only when at least one fuse is of a predetermined value.

4. A method as claimed in claim 1, characterized in that the fuse(s) comprises (comprise) a plurality of bits.

5. A method as claimed in claim 1, characterized in that the fuse(s) controlling access is (are) read from the EEPROM by means of a boot sequence during a reset phase.

6. A method as claimed in claim 1, characterized in that the fuse(s) controlling access is (are) stored in at least one state memory.

7. A method as claimed in claim 2, characterized in that a security row of the EEPROM where the fuses are located can be written to in a test mode of the microcontroller.

8. A method as claimed in claim 7, characterized in that a part of the EEPROM that is not the security row is protectable against write access by at least one fuse in the test mode of the microcontroller.

9. A method as claimed in claim 2, characterized in that writing to blocks of the EEPROM in block modes are handled by setting one or more of the fuses when the microcontroller is being tested.

10. An arrangement having a processor that is so arranged that control of access to an EEPROMs can be performed by controlling access to the EEPROM or parts of the EEPROM by fuses, at least one of the roses configured to automatically bar write access to the EEPROM in response to detection that the EEPROM has been erased.

11. An arrangement having a processor, as claimed in claim 10, characterized in that the processor is part of a smart-card controller and the arrangement is a smart card.

12. A computer software product that comprises a computer readable storage medium on which is stored a program that, once it has been loaded into the memory of a computer or smart-card controller, enables the computer or smart-card controller to perform control of access to an EEPROM or to parts of the EEPROM by fuses, at least one of the fuses configured to automatically bar write access to the EEPROM in response to detection that the EEPROM has been erased.

13. A computer-readable storage medium on which is stored a program that, once it has been loaded into a memory of a computer or smart-card controller, enables the computer or smart-card controller to perform control of access to an EEPROM or to parts of the EEPROM by fuses, at least one of the fuses configured to automatically bar write access to the EEPROM in response to detection that the EEPROM has been erased.

* * * * *